US009580899B2

(12) United States Patent
Rotondo et al.

(10) Patent No.: US 9,580,899 B2
(45) Date of Patent: Feb. 28, 2017

(54) STORM-POD SYSTEM FOR COLLECTING AND UTILIZING STORM WATER

(71) Applicant: ROTONDO ENVIRONMENTAL SOLUTIONS, LLC, Alexandria, VA (US)

(72) Inventors: Richard J. Rotondo, Alexandria, VA (US); John A. Rotondo, Arlington, VA (US)

(73) Assignee: Rotondo Environmental Solutions, LLC, Alexandria, VA (US)

( * ) Notice: Subject to any disclaimer, the term of this patent is extended or adjusted under 35 U.S.C. 154(b) by 25 days.

(21) Appl. No.: 14/742,991

(22) Filed: Jun. 18, 2015

(65) Prior Publication Data

US 2016/0369490 A1    Dec. 22, 2016

(51) Int. Cl.
*E03F 1/00* (2006.01)
*B65G 5/00* (2006.01)

(52) U.S. Cl.
CPC .............. *E03F 1/003* (2013.01); *B65G 5/00* (2013.01)

(58) Field of Classification Search
CPC .......... F16L 39/00; E03F 1/003; E02B 11/005
USPC ................................................. 405/124, 126
See application file for complete search history.

(56) References Cited

U.S. PATENT DOCUMENTS

| 634,759 | A | * | 10/1899 | Koch | F16L 39/00 138/102 |
| 2,153,789 | A | * | 4/1939 | Carswell | E02B 11/005 405/48 |
| 3,802,133 | A | * | 4/1974 | Gregory | E04B 1/3205 135/97 |
| 4,245,924 | A | * | 1/1981 | Fouss | B29C 65/02 138/119 |
| D329,684 | S | * | 9/1992 | Gray | D23/207 |
| 5,419,838 | A | * | 5/1995 | DiTullio | E03B 11/14 210/155 |
| 5,890,838 | A | * | 4/1999 | Moore, Jr. | E03F 1/003 405/43 |
| 6,698,975 | B1 | * | 3/2004 | Benecke | E03F 1/003 405/43 |
| 7,052,209 | B1 | * | 5/2006 | Kruger | E03F 1/003 405/125 |
| 7,160,058 | B2 | | 1/2007 | Burkhart | |

(Continued)

FOREIGN PATENT DOCUMENTS

CA    2450565 A1 *  9/2004    ............. E03F 1/003

*Primary Examiner* — Tara M. Pinnock
(74) *Attorney, Agent, or Firm* — Rosenberg, Klein & Lee (57) ABSTRACT

Applicant's underground storm-pod structure is directed to a system for collecting and utilizing storm-water. A pod structure includes at least one pod member. This pod member's structure is defined by sidewall members, end flanges, sidewall interfacing members, an upper section base member, reinforcing members, and a slab member. The sidewall member and the end flange form an opening. A retention chamber formed within the pod member is structured to store liquid. Weep holes formed through the sidewall members permit liquid to flow between a partially-elliptically-shaped pathway and a corresponding chamber. The liquid retention chamber can be in further communication with an outlet mechanism, which is itself in communication with an external environment. In one embodiment, adjacent pod members are fixedly coupled with respect to each other by coupling corresponding flange members.

18 Claims, 7 Drawing Sheets

(56) References Cited

U.S. PATENT DOCUMENTS

| | | | |
|---|---|---|---|
| 7,344,335 B2 | 3/2008 | Burkhart | |
| 7,419,332 B1 * | 9/2008 | Brochu | E03F 1/003 405/46 |
| D638,094 S * | 5/2011 | DiTullio | D23/202 |
| D668,318 S * | 10/2012 | DiTullio | D23/207 |
| 8,672,583 B1 * | 3/2014 | Mailhot | E02B 11/005 405/42 |
| 2005/0074285 A1 * | 4/2005 | Burnes | E03F 1/003 405/43 |
| 2007/0077122 A1 * | 4/2007 | Birchler | E03F 1/003 405/46 |
| 2014/0105684 A1 * | 4/2014 | Allard | E03F 1/005 405/52 |

* cited by examiner

STORM-POD SYSTEM FOR COLLECTING AND UTILIZING STORM WATER

FIELD OF THE INVENTION

The present system is generally directed to the field associated with systems for collecting, storing, and utilizing storm water or other waste liquid. More specifically, the system is located underground, and is concerned with underground rainwater harvesting, containment, filtration, and infiltration. The system relates to an innovative set of elements defining a pod member or a plurality of pod members which can be arranged in a desired pattern. The above structure allows for maximum storage volume to ensure water-tightness, while concomitantly minimizing the materials and costs associated with building the system.

BACKGROUND OF THE INVENTION

Applicant's underground system is concerned with stormwater management applications. In particular, the subject system is directed to a storm pod system which includes one or more pod members of predetermined contour, which directs the loads supported thereon to be dispersed through an elliptically-contoured sidewall which maximizes the strength of the structure. The modular design of Applicant's pod members, and the pod structures being of reinforced concrete design, ensure that Applicant's system is customizable to fit the requirements of various users. The design of Applicant's system further ensures a long service life and durability, and reduces the associated structural costs.

DESCRIPTION OF THE RELATED ART

Applicant's storm-pod structure provides five main advantages over those disclosed in the prior art: (a) Strength of the pod members, (b) Lighter weight of the pod members, (c) Lesser cost to produce and install the pod members, (d) multi-directional capabilities of the pod members and structure, and (e) modularity of the component elements to permit easy transport and interfacing of selected pod members in a variety of shapes and sizes responsive to geographical restraints imposed.

U.S. Pat. No. 7,344,335 to Burkhart and U.S. Pat. No. 7,160,058 to Burkhart disclose methods and systems that are directed to underground storm-water management systems.

With specific reference to the two Burkhart references, they provide a plurality of modules that are assembled in a certain area where liquid has to be collected. These modules are laterally and longitudinally aligned, each with respect to the other, to form continuous channels. This structure allows for flow of liquid between the various modules. Each of Burkhart's figures discloses one such module 1. This module 1 includes a substantially horizontally-disposed deck portion 12 having a planar upper surface, and two substantially vertically disposed side portions 13 which are loaded by the force applied to the planar upper surface. The deck portion 12 and side portions 13 form a longitudinal channel 13C and two openings on each of the side portions forms two lateral channels 13D. Since the above longitudinal and lateral channels are in fluid communication with each other, liquid or storm-water can flow in an unimpeded manner between these two channels.

The Burkhart references are directed to methods and structures for underground storm-water management systems. Both of the Burkhart references rely upon block-type modules interfacing with each other. The Burkhart references include planar block members modularly coupled to permit fluid communication therebetween. The particular block members of the Burkhart references rely on the planar surface construction which has the disadvantage of the force being applied to the surface of the modules to act in a perpendicular direction to the module upper surfaces. This has the effect of concentrating the loads applied to the upper surface and reducing the overall structural integrity of the module.

Such a block type of surface construction does not permit the load forces applied to be transferred to a sidewall through the sidewall extended area as is provided with the subject application system. Additionally, the Burkhart references are constructed to be substantially parallel to the ground surface which does not permit adequate space for planting of trees and other flora having roots descending into a pathway allowing the roots to grow and expand.

The Burkhart systems do not provide for an extended pathway for tree planting allowing the roots to grow within an extended elliptically contoured pathway without interfering with the overall structural design of the modules.

SUMMARY OF THE INVENTION

The Applicant's system provides a storm-pod structure that collects and utilizes storm-water. The structure comprises at least one pod member. Each pod member includes at least two partially elliptically-contoured sidewall members, where a respective sidewall member is interfaced with respect to a corresponding sidewall member to provide a partially-elliptically-shaped hyperbolic pathway. Each of these partially-elliptically-contoured sidewall members has a partially-elliptically-contoured end flange. Each of the end flanges and corresponding sidewall members forms a partially-elliptically-contoured opening, wherein adjacent contoured openings have axis lines substantially normal each to the other. The respective sidewall members and the end flanges have an upper section and a lower section. The sidewall members and the end flanges extend from the upper section to the lower section. An upper section base member is formed on the upper section. At least a pair of reinforcing members extends from the upper section base member to the respective end flange, and a slab member is secured to the lower section of the sidewall members. As a result of the above structure, an underground liquid retention chamber is formed.

An object of the subject system is to provide an underground liquid management system that collects, stores, harvests, and filters liquid overflow.

A further object of the subject system is to capture and store water and transport such to a surrounding environment.

A still further object of the subject system is to provide a storm pod structural system which disperses the load bearing on the system throughout extended sidewalls.

An object of the subject system is to provide elliptically-contoured sidewalls for interfacing sections of individual pod members.

A still further object of the subject system is to provide a truncated-elliptical-hyperbolic contour between interfacing sidewalls of adjacent sidewall members to create a depression.

Another object of the subject system is to permit growth of trees or other flora wherein roots may grow into an elliptically-shaped hyperbolic volume.

A still further object of the subject system is to create a liquid management system which has reinforcing members coupled to the upper section base member and flange sections for increased structural stability.

Another object of the subject invention is to provide a storm pod system for collecting and utilizing storm water or other liquid which has modularity and can be formed in a variety of shapes, contours and sizes.

A further object of the subject system is to create a system where the system is composed of individual pod members, which can be easily transported to a site where the individual pod members may be interfaced into a variety of sizes, shapes, and desired liquid containment chambers.

DESCRIPTION OF THE PREFERRED EMBODIMENTS

Figure 1:
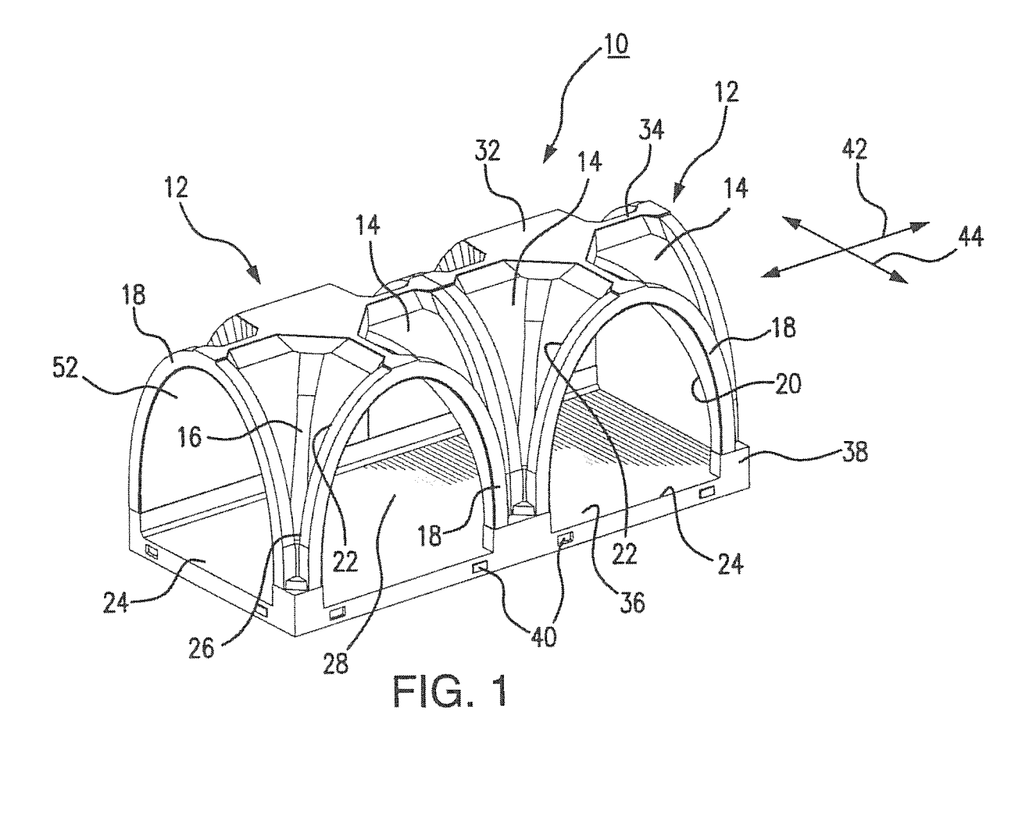
FIG. 1 is a perspective view of a pod structure which contains a plurality of pod members.
Figure 2:
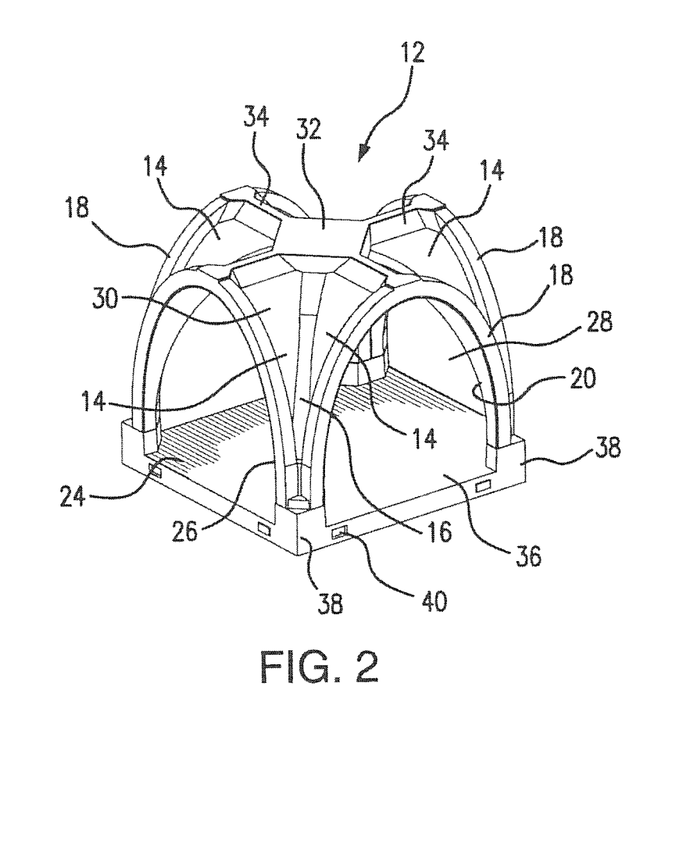
FIG. 2 is a perspective view of a single pod member.
Figure 4:
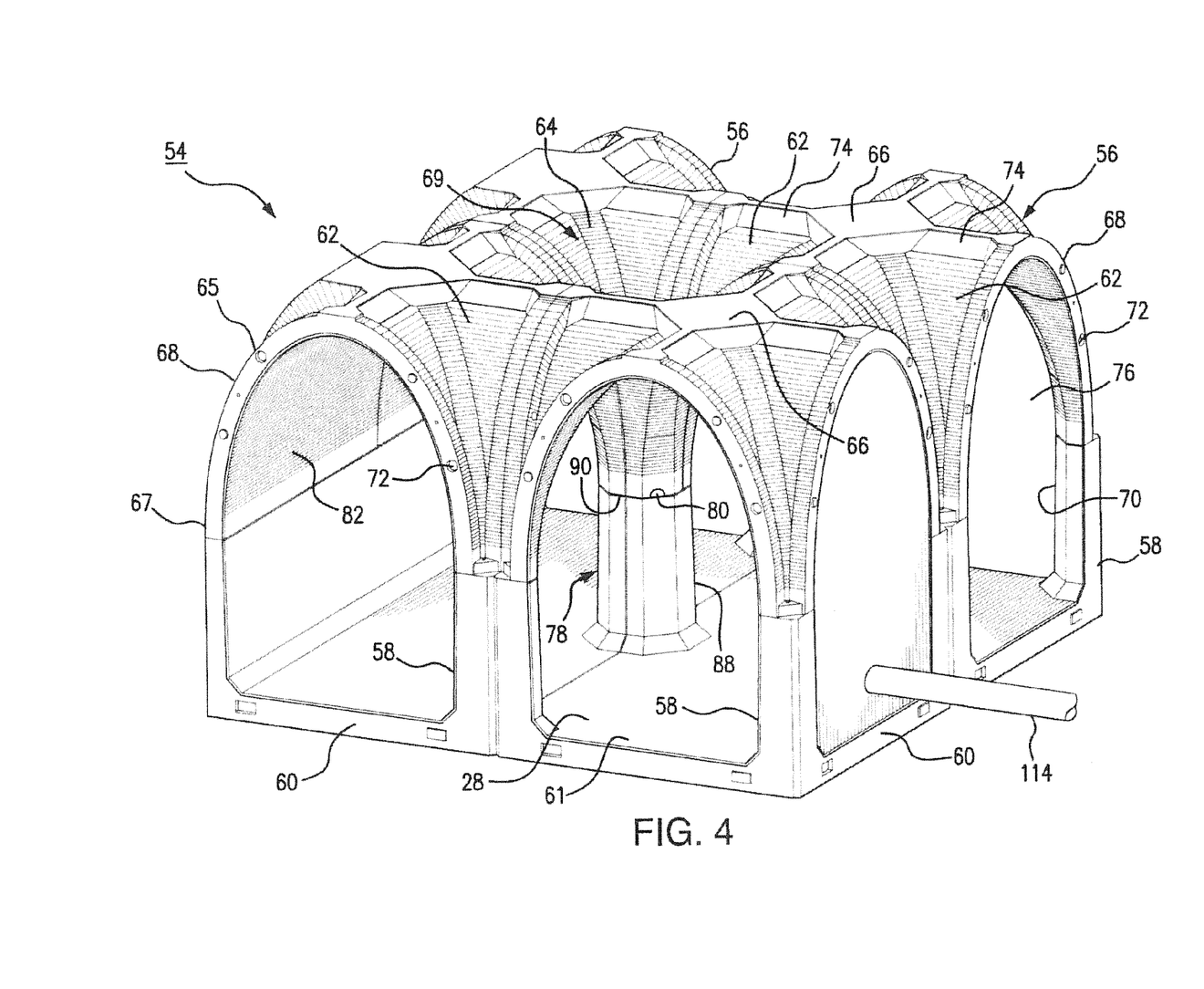
FIG. 4 is a perspective view of a storm pod system formed by four pod members, each mounted in interfacing relation to the other.

Referring now to FIGS. 1 and 4, there are shown storm pod systems 10 & 54 for collecting, storing, and harvesting storm-water. Storm pod system 10 (as shown in FIG. 1) is composed of one or more storm pods 12 shown in FIG. 2. Storm pods 12 may take on various configurations and additional elements to be described in the following paragraphs. In its basic component structure, each storm pod 12 (as shown in FIG. 2) is generally formed of elliptically-contoured sidewall members 14 which are joined by elliptically-shaped interfacing members 16, as is seen clearly in FIGS. 1 and 2. Elliptically-shaped sidewall members 14 terminate in flanges 18 to provide respective elliptically contoured archways 20.

As seen in FIG. 4, stormwater and other waste liquid is discharged into liquid retention chamber 76 through stormwater pipe 114 which passes through stormwater wall 116 for accumulating run-off water, stormwater, and other waste liquid, within the liquid retention chamber. One stormwater wall 116 is shown for clarity purposes; however, other openings 70 may accommodate other stormwater walls 116 to provide an enclosure for the storm pod structure.

When a storm pod 12 is mounted in an interfacing relationship with an adjacent storm pod 12, as is seen in FIG. 1, elliptically contoured sidewall members 14 in combination with the elliptically-shaped interfacing members 16 form a truncated ellipsoid-hyperbolic pathway within which flora may be planted, and such pathway 22 may also provide for a removal of rain water or other liquid passing through an interior of storm pod structure 10.

Referring to FIG. 2, each storm pod 12 includes slab member 24 secured to a lower section 26 of each sidewall member 14. The combination of the storm pod 12 and slab member 24 thus form a liquid retention chamber 28 wherein rain water or other waste liquid can pass and be dispersed from one storm pod 12 to an adjacent storm pod.

Each storm pod 12 includes sidewall upper section 30 formed in one piece formation with sidewall lower section 26. Upper section base member 32 is formed in one piece formation with sidewall members 14, as is seen in FIGS. 1 and 2. As seen, upper section base member 32 may be generally planar in contour in its upper surface and is coupled to respective flanges 18 by reinforcing members 34. Reinforcing members 34 in combination with upper section base member 32 provide for stabilization between respective sidewall members 14 and flanges 18. Reinforcing members 34 provide for structural integrity of storm pod 12 in a manner where forces applied to the sidewall members and the overall storm pod 12 can be dispersed through the elliptically-shaped sidewall members 14, interfacing members 16, and elliptically-contoured flanges 18.

Slab member 24 may include a substantially planar floor section 36 where slab member 24 is formed in a substantially rectangular contour. Slab member 24 may include four side posts 38 formed on each corner of slab member 24. Side posts 38 interface with and are coupled to respective ends of respective flanges 18, sidewall members 14, and interfacing members 16, as is seen in FIGS. 1 and 2. Slab members 24 may include tongue-in-groove connections 40 for mounting one storm pod 12 to an adjacent storm pod 12. It is to be understood that one storm pod 12 may be mounted to an adjacent storm pod 12 in a number of ways, not important to the inventive concept as herein described. Such connections may include threaded connections or other like-type of mechanical securement of each of the storm pods 12 to the other.

The depiction of storm pod 12 as shown in FIG. 2 is generally referred to as a 360° type of storm pod where there are four elliptically contoured archways 20 providing ingress and egress from the liquid retention chamber 28. Liquid flowing into liquid retention chamber 28 may be dispersed to an adjacent pod in an overall structure which will be detailed in following paragraphs.

Referring now to FIG. 1, there is shown storm pod structure 10 which, for purposes of example, shows a pair of storm pods 12 mounted to each other in an interfacing manner in order that there is fluid communication between each of storm pods 12 in longitudinal axis direction 42. Additionally, as is seen in FIG. 1, fluid communication in a 360° formation of storm pod 12 permits fluid communication between adjacent storm pods in both the longitudinal direction 42 and the transverse direction 44. Mounting of one storm pod 12 to an adjacent storm pod 12 may be accomplished through bolting, threaded securement, or tongue-in-groove connections, to permit an overall storm pod structure 10 which is essentially formed in one-piece formation.

Figure 3:
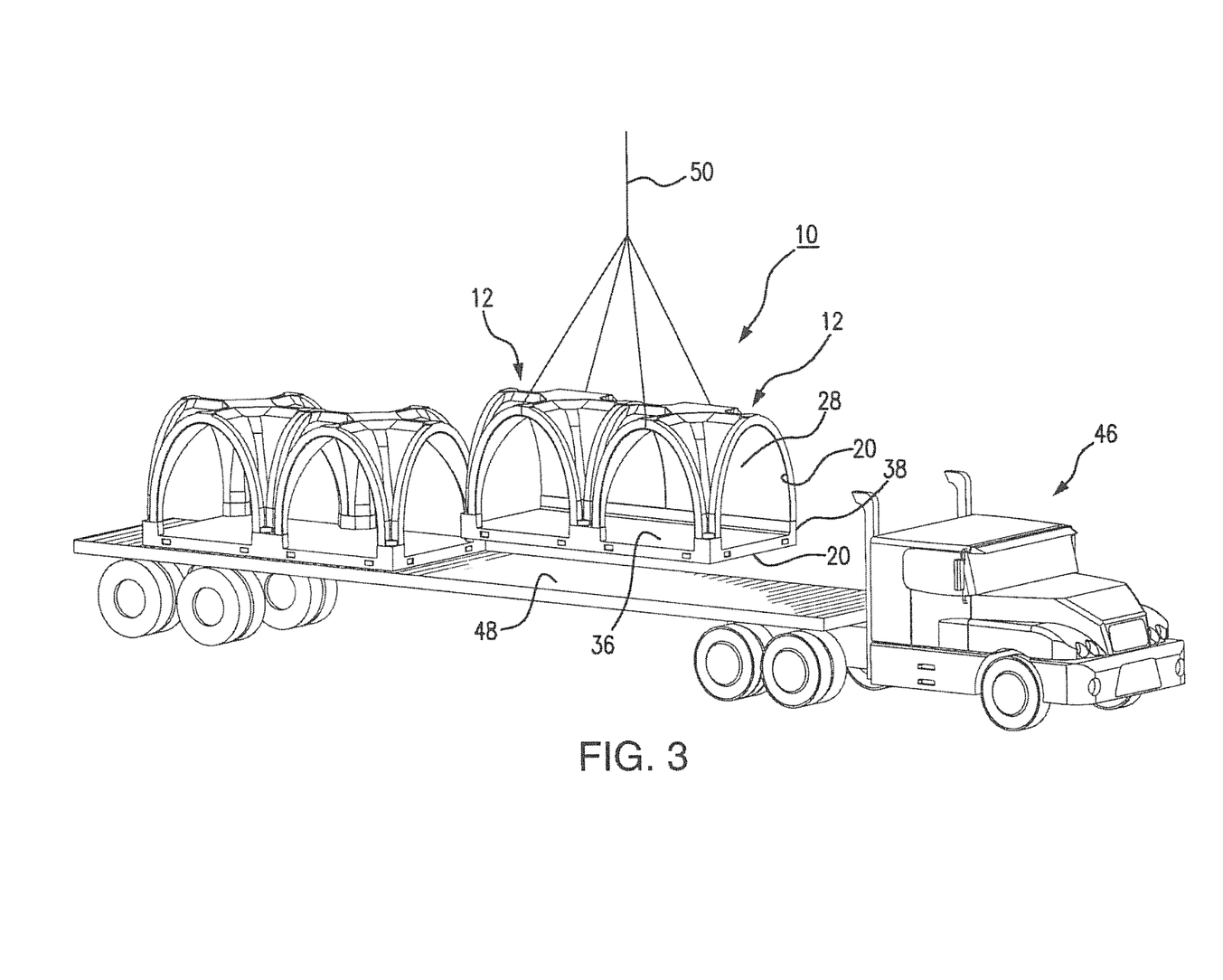
FIG. 3 is a perspective view of a pair of pod members being mounted on a vehicle.

One of the great advantages of storm pods 12 and the storm pod structure 10 is shown in FIG. 3, where storm pod structure 10 may be hoisted onto a truck or other vehicle 46, and hoisted onto the flatbed 48 of the vehicle 46 through hoist lines 50, and be easily transported over long distances to permit on-site construction of the storm pod system. Thus, storm pods 12 may be prepared off-site and transported to the necessary location in a modular manner and thus, provide for large savings in the construction of the storm pods 12 at the location where needed.

Figure 5:
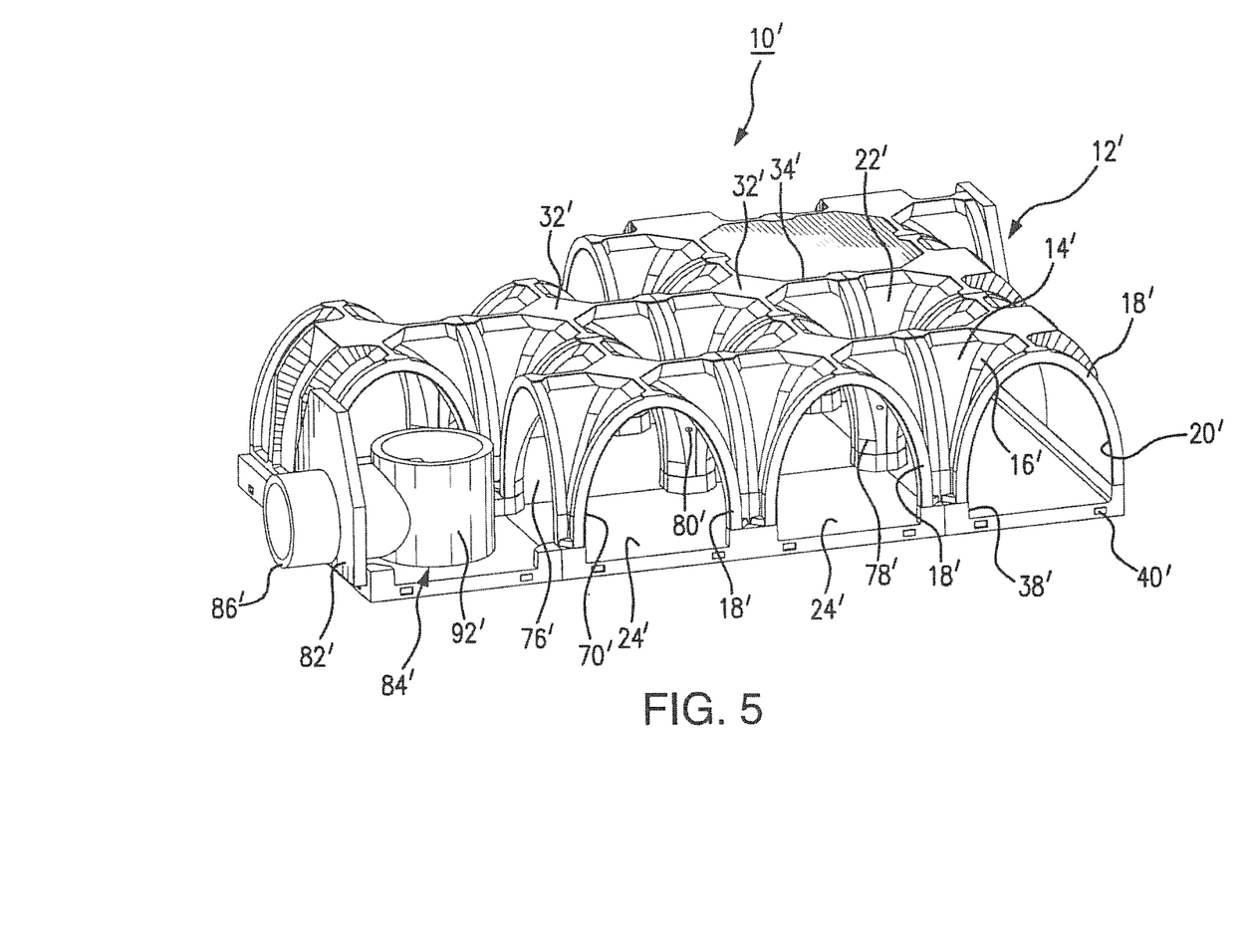
FIG. 5 is a perspective view of a storm pod system showing a plurality of interfacing pod members with a weir having an outlet.

Dependent upon an overall structure system of storm pods 12, flow of rain water or other liquid can be adjusted or redirected from one pod to another along axis lines 42 and 44 to either allow fluid communication between adjacent storm pods 12, or the blockage of the liquid to be transported in a different direction. As seen in FIG. 1, there is shown what is commonly referred to as a 180° storm pod structure 10 wherein liquid is in fluid communication between adjacent storm pods 12 in longitudinal direction 42, but is somewhat constrained by back wall panel 52 in transverse direction 44. In this manner, a series of storm pods 12 may be interfaced in coupled relation each to the other to form an overall structure which is adaptable to the site layout desired. This type of overall pod structure system is seen in FIG. 5 wherein a plurality of storm pods 12' are mounted each with respect to the other to form a system which provides different pathways between one storm pod 12' and adjacent storm pods 12' to be contoured to the desired area where the storm pod system 10' is needed.

With reference to FIGS. 1 and 2, by controlling both the area occupied by the side wall member 14, flange member 18, and the height of the upper section base member 32 in each of the storm pods 12 for the pod structure 10, a user can tailor the retention chamber 28's retention capability to fit their particular needs. There is also an added advantage of allowing the user to utilize their own excavators to install the storm pod structures 10 in their construction site, and thus greatly reduce the cost of installation. In a particular embodiment, these individual storm pod structures 10 can weigh in the range of 4000 to 5000 pounds. In other embodiments, the storm pods 12 can be of precast concrete construction, and provide for a longer durability and service life for the pod structures 10.

Referring now to FIG. 4, there is shown a storm pod structure 54 which includes four pod members 56 that are formed in an interfacing relationship. This interfacing relationship allows for the collection, storage, and utilization of storm water or other waste liquid, as was described in previous paragraphs. The structure and contouring of pod members 56 are substantially equivalent to the pod members 12 that were provided in FIGS. 1-2. Storm pod structure 54 includes a slab member 60 that forms a base for the pod members 56.

As is seen in FIG. 4, support members 58 extend from an upper surface 61 of slab 60 in a vertical direction. Slab members 60 and support members 58 may be formed in a one-piece formation, and may be composed of a cast concrete, metal or some other composition impervious to liquid. Support members 58 are provided for at each corner of slabs 60, and are in vertical interfacing relation with respective pod members 56. Slab support members 58 may have a predetermined vertical length dependent upon a user's particular requirements to provide selected volumes for liquid retention chambers 76, as is seen. Support members 58 also provide support to sidewall members 62. As a result of the above structure, respective pod members 56 rest on respective support members 58 to provide for a substantially vertical compressive force that is applied to support members 58.

The dispersement of forces through the sidewall members 62 in a substantially compressive vertical direction allows storm pod structure 54 to have increased structural stability. Each storm pod member 56 has an upper section 65 and a lower section 67. The lower section 67 has a direct interface connection with the support members 58. It is noted here that the length of support members 58 may vary dependent upon the desired size of the particular liquid retention chambers 76 that is needed for accumulation of liquid therein.

Each of pod members 56 include sidewall members 62 which are formed of at least a partial elliptical contour, as was previously discussed in relation to pod members 12. The disclosed pod members 56 provide for at least a pair of elliptically contoured sidewall members 62. When these sidewall members 62 are interfaced, it results in the partially elliptically and truncated hyperboloid pathway 69. This pathway allows for drainage of liquid through the possible placement of earth that is packed into pathway 69 to be filtered by gravity assist.

Every pod member 56 includes at least a pair of sidewall members 62. The pair of sidewall members 62 associated with corresponding pod members 56 interfaces with associated sidewall interfacing members 64. Sidewall members 62 extend in an elliptical manner from upper section 65 of storm pod 56 to lower section 67. Each sidewall member 62 includes a flange member 68 which is formed in at least a partial elliptical contour, and which provides for an inner surface for both the flange member 68 and sidewall members 62 having the overall partial elliptical contour. The disclosed pod member 56 includes an upper section base member 66. Each upper section base member 66 is located at the upper section 65 of the respective storm pod 56.

Upper section base members 66 are joined in a one-piece construction to respective flange members 68 through reinforcing members 74 to provide greater structural integrity to the overall storm pod structure 54.

Each sidewall member 62 terminates in a respective flange member 68. These flange members 68 are of at least partial-elliptical contour in order to provide for an efficient pathway for the force loads that are applied to the storm pod structure 54. Flange members 68 in combination with support members 58 and slab member 60 provide for at least a partially elliptical opening 70.

Respective pod members 56 are interfaced, each with respect to the other, in a fixed fashion through sidewall flange coupling members 72. These coupling members may be a tongue-in-groove connection, threaded coupling, or other bolting type mechanism, which in itself is not important to the inventive concept described herein, with the exception that an adjacent pod member 56 is fixedly attached to another adjacent pod member 56. In this manner, respective pod members 56 may be joined together to form the storm pod structure 54, as shown.

The reinforcing members 74 between upper section base member 66 and corresponding flange members 68 are provided to maintain rigidity and mechanical stability between the flange members and the corresponding sidewall members 62.

As was previously described, retention chamber 76 acts as a storage mechanism for storm water or other liquid that is being stored in the storm pod structure 54. The retention capability of each such retention chamber 76 is defined by the volume surrounded by the sidewall members 62 and the upper surface of the slab member 61. The retention capabilities of differing volumes of storm water or liquid that a user desires to store can be controlled by the sizing of support members 58 in combination with the sidewall members 62.

With the arrangement as shown in FIG. 4, a center structure 78 is shown which includes a center structure support member 88 that is secured to respective sidewall members 62 at an interface line 90. This center structure 78 is formed as a result of the respective pod members 56 being coupled, each to the other, by having respective sidewall members 62 connected to corresponding sidewall coupling members 72 of a respective pod member 56.

Responsively, the center structure 78 includes the sidewall members 62 mounted on an upper surface thereof at interface 90, and as a result, it includes sidewall members 62, sidewall interfacing members 64, flange members 68, sidewall coupling members 72, and reinforcing members 74 associated with each of the four pod members 56 shown.

Center structure 78 is shown to be a central paramount structure around which the respective pod members 56 are positioned in a surrounding manner. It includes one or more weep holes 80 that permit liquid within the elliptically formed pathway 69 to be dispersed into the liquid retention chambers 76. These weep holes 80 are generally formed through respective sidewalls 62 to provide a pathway for liquid or storm-water to be dispersed therethrough.

The aforementioned elliptically formed pathway 69 provides directionality to liquid or storm-water to flow through gravity assist, and such liquid or storm-water flows in the direction of the elliptical-shaped pathways in a substantially vertical manner. When excess liquid or storm-water comes into contact with the bottom of the elliptical pathway 69, water then flows through weep holes 80 into the respective liquid retention chamber 76. Weep holes 80 may be formed in an equally displaced manner around a lower section of each sidewall 62 to provide for an even distribution into liquid retention chambers 76.

Since weep holes 80 are positioned at the bottom section 67 of respective pod members 56, liquid or storm-water has the option of flowing through both sides of the sidewall member 62 associated with the center structure 78. Liquid or storm-water may thus be evenly distributed to liquid retention chambers 76 subsequent to flowing through the partial-elliptical pathways 69 provided by the sidewall members 62, and evenly distribute the liquid into respective liquid retention chambers 76 for storage therein.

Weep holes 80 permit reversible flow of wastewater therethrough. Weep holes 80 permit water to migrate from liquid retention chamber 76 to the elliptically formed pathway 69 as water rises in liquid retention chamber 76. Additionally, when water levels in the retention chamber 76 lowers, water stored in the storm pod within the elliptical pathway 69 may be passed into the retention chamber 76 by way of weep holes 80.

Different configurations of storm pod structure 54 may be accomplished such as shown in FIGS. 4 and 5. In the storm pod structure 54 shown in FIG. 4, an end wall 82 may close the opening 70 of one of more storm pods 56. Each such end wall 82 is positioned adjacent to opening 70 in at least one storm pod member 56, and the end wall 82 is contiguous to the outer surface of opening 70. End walls 82 may also be coupled through bolting, threaded securement, or any like technique to close openings 70 that are formed in a respective flange member 68. As shown in FIG. 4, one end wall is provided for explanatory purposes; however, a plurality of such end wall panels 82 may be formed over different openings 70 to provide a directed flow of liquid in a particular direction as necessitated by the user's needs.

Each of storm pod members 56 may be formed in substantially one-piece formation of cast concrete or some other similar material. It is also noted that slab members 60 in combination with support members 58, and the center structure support member 88, may also be formed in a one-piece formation similar to the construction of pod members 56. The combination may also be formed of a liquid impervious material, such as cast concrete, metal, or other similar composition.

Thus, in overall concept, FIG. 4 provides for a storm pod structure 54 which may be formed substantially in a one-piece formation. It also provides for a loading capability which disperses the loads imposed thereupon through the elliptical sidewall members 62. In this manner, optimization of the loading capabilities of storm pod structure 54 is realized, and such permits efficient dispersal of storm water or other liquid into liquid retention chamber 76.

Figure 6:
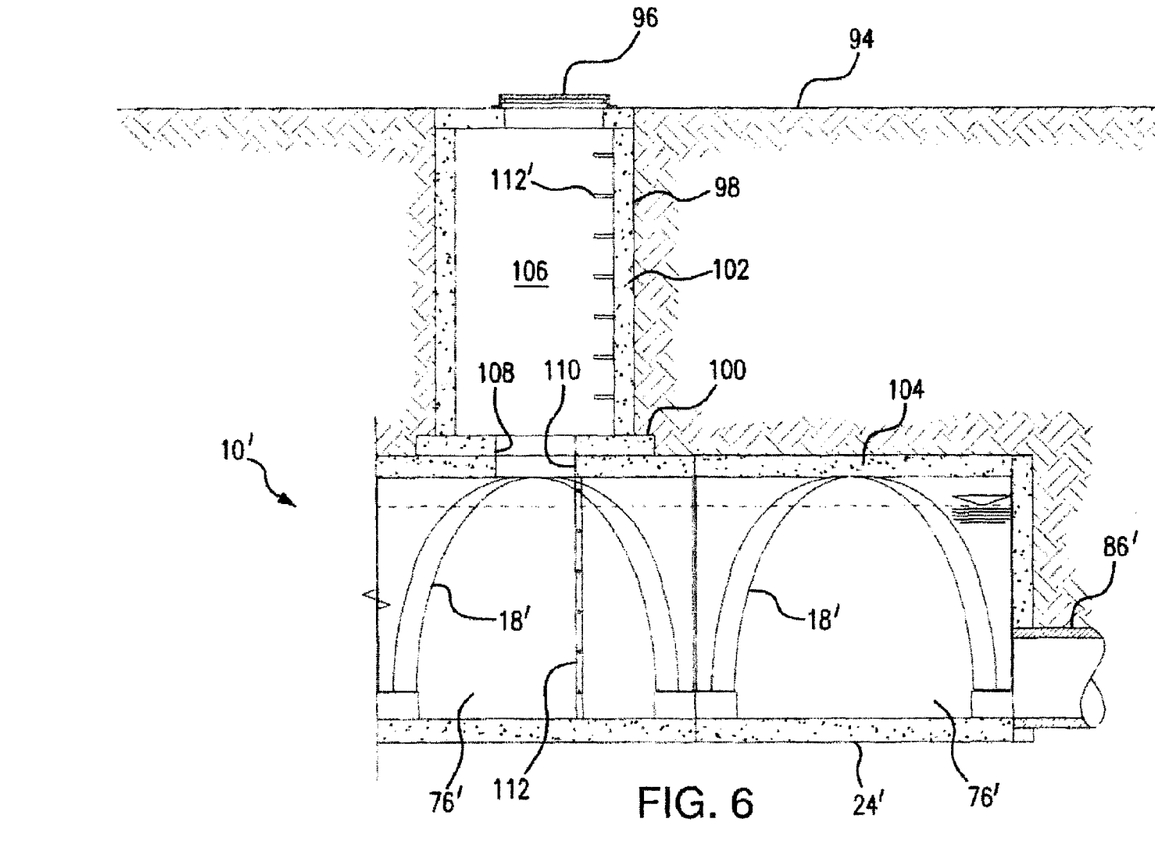
FIG. 6 is a schematic elevational view of a pod structure embedded into a ground surface.

Referring now to FIG. 5, there is shown a particular storm pod system 10' which is arranged of a plurality of storm pods 12' as previously described. Storm pod structure 10' is arranged in a manner which is geographically commensurate with a particular layout with necessary constraints associated with the size of the area within which storm pod structure 10' is to be located and positioned beneath a ground surface (as seen in FIG. 6). Storm pod structure 10' consists of a plurality of matingly engaged storm pods 12' whose overall interfacing and construction is dictated by a user's need with regard to a particular geographical location. In overall concept, storm pod structure 10' may be constructed to be positioned in a variety of specific arrangements dictated by liquid runoff from a parking lot, street, or other like ground level considerations. FIG. 5 is provided to show the ability of mounting storm pods 12' each with respect to the other in a varied type of arrangement to permit storm water or other liquid to be retained and exited through an outlet mechanism 84'. In such an arrangement as indicated by FIG. 5, a plurality of liquid retention chambers 76' may interact each with respect to the other in fluid communication to provide an expanded area where liquid or water may be retained.

As previously described, a pair of storm pods 12' may be interfaced each to the other by coupling members 40' to provide a liquid impervious coupling mechanism joining each storm pod 12' to an adjacent storm pod 12'. In general, when four storm pods 12' are coupled each to the other in a configuration shown in FIG. 5, ellipsoidal hyperbolic pathway 22' is formed to permit liquid or rain water to be passed through gravitational assist through pathway 22' and to exit a center structure 78' through weep holes 80'. Water or other liquid thus passes into specific liquid retention chambers 76'.

Flanges 18' and side walls 14' in combination with interfacing members 16' form liquid retention chamber 76'. Flanges 18' are secured to slab members 24' and are mounted thereto through side posts 38'.

As previously described, flanges 18' are formed at ends of corresponding side wall members 14' of respective storm pods 12' which act as a reinforcing section between upper section base members 32' and respective flange members 18'.

One or more storm pods 12' may include an end wall 82' which closes off at least one of the openings 70' formed by flanges 18'. End walls 82' will essentially close off a respective opening 70' to permit retention of liquid or overflow rain water to be maintained within one or more of liquid retention chambers 76'.

End walls 82' are generally formed in a contour which covers opening 70' and may be formed of concrete, metal composition, or any like composition impervious to liquid flow in order to provide a predetermined end point for the flow of liquid or rain water external to the overall storm pod structure 10'.

Thus, end wall panels 82' which are positioned adjacent and contiguous to a respective flange member 18' can be used as a channeling method through a myriad of pathways for liquid and provides an enclosure for storm pod structure 10'. Although a single end wall panel 82' is shown in FIG. 5, a plurality of such end wall panels 82' may be located adjacent and contiguous to respective flange members 18' of one or more pod members 12'. Such end wall members 82' are adjacently positioned and contiguous with respect to respective flange members 18'. Such end wall panels 82' may be elliptically contoured to the contour of the archways formed by flanges 18' and act as a boundary perimeter around the perimeter of the storm pod structure 10'. The particular contouring of end panels 82' is not important to the inventive concept as herein described, with the exception that they provide a blocking member for terminating the fluid communication from a particular storm pod member 12' and either an adjacent storm pod member 12' or the surrounding atmosphere which may be simply the ground. Thus, such end wall panels 82' act as a boundary block around the perimeter of the storm pod structure 10' and function to aid corresponding liquid retention chambers 76' in retaining the liquid or overflow water stored therein.

Outlet mechanism 84', as shown in FIG. 5, is provided to permit overflow water to be passed from liquid retention chambers 76' external to storm pod structure 10'. In general, outlet mechanism 84' is positioned and located within one of liquid retention chambers 76' to permit overflow water to be passed external to pod structure 10'. One type of outlet mechanism 84' is shown in the cutaway portion of one of retention chambers 76' and is generally fixedly secured to slab member 24'. A plurality of outlet mechanism 84' can be positioned within respective liquid retention chambers 76' and are in fluid communication with both the external environment and the associated liquid retention chamber 76'.

Liquid passes from generally ground level into liquid retention chambers 76' and the liquid level rises as liquid accumulates within storm pod structure 10'. Outlet mechanism 84' includes a tank-like element 92' of predetermined height above slab member 24'. As liquid rises in liquid retention chamber 76' and reaches the top therein, liquid overflows onto tank member 92'. Attached to tank member 92' is outlet pipe 86' which is in fluid communication with the internal volume of tank member 92'. Outlet pipe 86' extends through end wall 82' to permit overflow water from liquid retention chamber 76' to be passed external to pod structure 10'. End walls 82' may be fixedly secured to respective flange members 18' through bolting, threaded securement, or some like technique, not important to the inventive concept, with the exception that such end walls 82' may be contoured in a similar elliptical shape as the flange members 18' or otherwise contoured in any contour to provide the blockage necessary.

In this manner, liquid or storm water that has been stored in the liquid retention chamber 76' can be transferred to an external environment. Outlet mechanism 84' acts as a conduit between the external environment and liquid retention chamber 76'.

Referring now to FIG. 6, there is shown a schematic elevational cross-sectional view of pod structure 10' being adapted to be positioned and located below a ground level 94 in combination with a grate 96. FIG. 6 shows placement of pod structure 10' below ground level 94 to permit accumulation of liquid within liquid retention chambers 76'.

Riser 98 may include riser side walls 102 formed in generally cross-sectional circular contour to provide a riser chamber 106 through which liquid may pass through grate 96 into riser chamber 106 and then eventually into liquid retention chambers 76'. Riser 98 is mounted on riser base 100 which includes riser bottom opening 108.

Upper slab 104 includes upper slab opening 110 which is in fluid communication with riser chamber 106 through riser bottom opening 108 to permit a fluid communication pathway from riser 98 into liquid retention chambers 76'. Upper slab 104 is mounted over pod structure 10' to provide stability and a mounting base for riser 98.

As can be seen, riser 98 may include a series of rungs 112' to permit access to chamber 106. Similarly, a ladder system may be provided for liquid retention chamber 76' where the ladder system 112 is schematically shown. In this manner, manual access to pod structure 10' may be accessed. Additionally, schematically shown in FIG. 6 is outlet pipe 86' for passage of overflow liquid to the external environment, as previously discussed.

Figure 7:
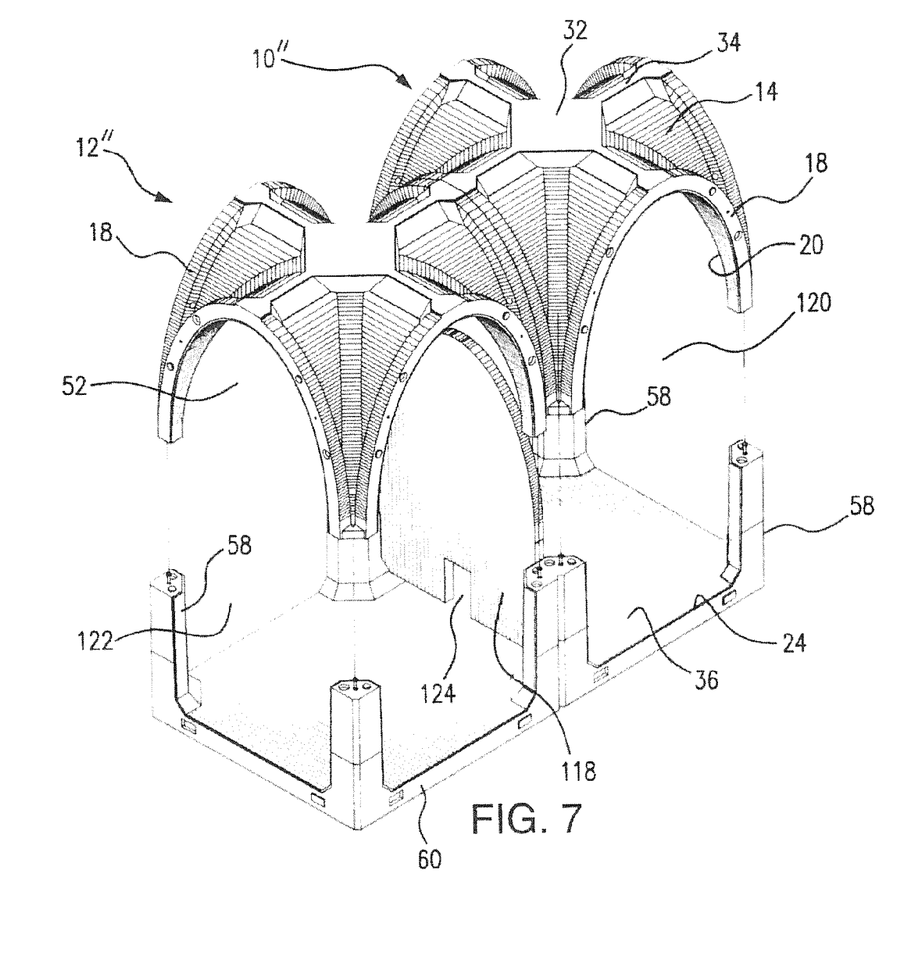
FIG. 7 is an expanded view of a pod structure having an interior wall panel to establish a plurality of liquid retention chambers.

Referring now to FIG. 7, there is shown a substantially exploded view of a storm pod structure 10" with an interior wall panel 118 for dividing liquid retention chamber 76 into two liquid retention chambers 120 and 122. Interior wall panel 118 separates chamber 76 into a pair of retention chambers 120 and 122.

Interior wall panel 118 is fixed to slab member 24 either by bolting, threaded securement, or some like techniques not important to the inventive concept, with the exception that the interior wall panel is fixedly secured to slab member 24. Interior wall panel 118 may be formed of precast concrete, plastic, or some like composition. Interior wall panel 118 is contoured to matingly engage with elliptically contoured archways 20 to form a seal therewith.

Interior wall panel 118 provides structural support for storm pod structure 10", and further provides for some fluid interdependence between liquid chambers 120 and 122. Interior wall panel opening 124 permits the water level in chamber 120, 122 to equalize by allowing fluid communication between the chambers 120 and 122.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A storm-pod structure for collecting and utilizing storm-water, said structure comprising:
   at least one pod member, each pod member including:
   at least two partially-elliptically-contoured sidewall members, a respective sidewall member being interfaced with respect to a corresponding sidewall member to provide a partially-elliptically-shaped pathway;
   each of said at least two partially-elliptically-contoured sidewall members having partially-elliptically-contoured end flanges;
   said end flanges and corresponding said sidewall members forming at least two partially-elliptically-contoured openings, said at least two partially-elliptically contoured openings having corresponding axis lines extending substantially normal each to the other;
   said respective sidewall members and said end flanges having an upper section and a lower section, said sidewall members and said end flanges extending from said upper section to said lower section;
   an upper section base member formed on said upper section;
   at least a pair of reinforcing members extending from said upper section base member to said respective end flanges;

a slab member secured to said lower section of said at least two sidewall members, wherein said at least one pod member is contoured with a liquid retention chamber formed between said at least to partially-elliptically-contoured sidewall members and said slab member; and a fluid communication mechanism positioned in proximity to said upper section base member and configured at the top of said at least one pod member by said partially-elliptically-contoured sidewall members and coupled to said liquid retention chamber to form a gravity assisted fluid passage between external surroundings of said at least one pod member and said liquid retention chamber, said fluid communication mechanism forming a truncated ellipsoid-hyperbolic pathway.

2. The storm-pod structure for collecting and utilizing storm-water as recited in claim 1, further comprising at least one sidewall interfacing member between respective sidewall members, wherein said sidewall interfacing member extends from said upper section base member to said lower section.

3. The storm-pod structure for collecting and utilizing storm-water as recited in claim 2, wherein said sidewall interfacing member is partially-elliptically-contoured.

4. The storm-pod structure for collecting and utilizing storm-water as recited in claim 1, further comprising at least a pair of adjacent and contiguously positioned pod members in fluid communication each with respect to the other.

5. The storm-pod structure for collecting and utilizing storm-water as recited in claim 4, wherein said respective adjacent pod members are fixedly coupled with respect to each other by coupling said corresponding flange members of respective pod members to each other.

6. The storm-pod structure for collecting and utilizing storm-water as recited in claim 5, wherein said respective openings corresponding to said corresponding flange members fixedly coupling said respective adjacent pod members, are of partial-elliptical-contour.

7. The storm-pod structure for collecting and utilizing storm-water as recited in claim 4, further comprising an interior wall panel mounted on said slab member for dividing said adjacently positioned pod members into at least two liquid retention chambers.

8. The storm-pod structure for collecting and utilizing storm-water as recited in claim 7, wherein said interior wall panel includes an opening passing therethrough for passage of said liquid therethrough.

9. The storm-pod structure for collecting and utilizing storm-water as recited in claim 1, wherein said respective pod members are formed from either one of a precast concrete or a plastic composition.

10. The storm-pod structure for collecting and utilizing storm-water as recited in claim 1, wherein said respective pod members are formed in a one-piece formation.

11. The storm-pod structure for collecting and utilizing storm-water as recited in claim 1, wherein said respective sidewall members and said corresponding end flanges define a recess.

12. The storm-pod structure for collecting and utilizing storm-water as recited in claim 1, wherein said sidewall members include weep holes formed therethrough for permitting liquid to flow between said partially-elliptically-shaped pathway and said corresponding chamber.

13. The storm-pod structure for collecting and utilizing storm-water as recited in claim 1, further comprising at least one end-wall panel, each said end-wall panel being positioned corresponding to a respective partially-elliptically-contoured opening.

14. The storm-pod structure for collecting and utilizing storm-water as recited in claim 13, further comprising an outlet mechanism in fluid communication with said liquid retention chamber of said at least one pod member and an external environment.

15. The storm-pod structure for collecting and utilizing storm-water as recited in claim 14, wherein said outlet mechanism includes a weir member secured to said slab member of said pod member.

16. The storm-pod structure of claim 1, wherein said sidewall members have at least one weep hole formed therein, wherein a plurality of said at least one pod members are interconnected along said corresponding axis lines extending substantially normal each to the other into an array-like structure through said end flanges of respective of said partially-elliptically contoured openings, wherein said fluid communication mechanism includes a pathway formed by corresponding said sidewall members of adjacent four of said plurality of pod members interconnected each with another, and wherein said at least one weep hole creates a passage for the liquid between said pathway and said liquid retention chambers of said adjacent interconnected four pod members.

17. A storm-pod structure for collecting and utilizing storm-water, comprising:

at least one pod member, each pod member including:

at least two partially-elliptically-contoured sidewall members, a respective sidewall member being interfaced with respect to a corresponding sidewall member to provide a partially-elliptically-shaped pathway;

each of said partially-elliptically-contoured sidewall members having partially-elliptically-contoured end flanges;

each of said end flanges and corresponding said sidewall members forming a partially-elliptically-contoured opening, each said at least one pod members having at least two said partially-elliptically-contoured openings having axis lines extending substantially normal each to the other, and at least one end-wall panel positioned in correspondence to a respective one of said at least two partially-elliptically-contoured openings;

said respective sidewall members and said end flanges having an upper section and a lower section, said sidewall members and said end flanges extending from said upper section to said lower section;

an upper section base member formed on said upper section;

at least a pair of reinforcing members extending from said upper section base member to said respective end flanges;

a slab member secured to said lower section of said at least two sidewall members, whereby wherein said at least one pod member is contoured with a liquid retention chamber for said at least one pod member is formed; and an outlet mechanism positioned in fluid communication with said liquid retention chamber of said at least one pod member and an external environment, wherein said outlet mechanism includes a weir member secured to said slab member of said pod member, where said weir member is an open-ended tank member extending a predetermined height above said slab member.

18. The storm-pod structure for collecting and utilizing storm-water as recited in claim 17, further comprising an outlet pipe secured to a sidewall of said tank member, and in fluid communication therewith, said outlet pipe extending through said end-wall panel for transporting liquid from said tank to said external environment.

* * * * *